United States Patent
Bae et al.

(10) Patent No.: US 11,826,734 B2
(45) Date of Patent: Nov. 28, 2023

(54) CATALYST STRUCTURE FOR LOHC DEHYDROGENATION REACTOR

(71) Applicant: KOREA ADVANCED INSTITUTE OF SCIENCE AND TECHNOLOGY, Daejeon (KR)

(72) Inventors: Joongmyeon Bae, Daejeon (KR); Sanghun Lee, Daejeon (KR); Taehong Kim, Daejeon (KR); Jaemyung Lee, Daejeon (KR); Gwangwoo Han, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 17/539,801

(22) Filed: Dec. 1, 2021

(65) Prior Publication Data

US 2022/0305469 A1 Sep. 29, 2022

(30) Foreign Application Priority Data

Mar. 26, 2021 (KR) .................. 10-2021-0039505

(51) Int. Cl.
*B01J 21/04* (2006.01)
*B01J 21/08* (2006.01)
*B01J 21/12* (2006.01)
*B01J 23/42* (2006.01)
*B01J 23/44* (2006.01)
(Continued)

(52) U.S. Cl.
CPC ............. *B01J 23/892* (2013.01); *C01B 3/326* (2013.01); *C01B 2203/0805* (2013.01); *C01B 2203/1058* (2013.01); *C01B 2203/1064* (2013.01); *C01B 2203/1211* (2013.01)

(58) Field of Classification Search
CPC ... B01J 21/04; B01J 21/08; B01J 21/12; B01J 23/42; B01J 23/44; B01J 23/462; B01J 23/755; B01J 23/892; B01J 35/04; C01B 2203/0805; C01B 2203/1058; C01B 2203/1064; C01B 3/326; C01B 2203/1211
See application file for complete search history.

(56) References Cited

U.S. PATENT DOCUMENTS 4,328,130 A * 5/1982 Kyan ..................... B01J 35/026
502/100
4,749,671 A * 6/1988 Saito .................. B01D 39/2017
502/313
(Continued)

FOREIGN PATENT DOCUMENTS

JP 2006-248814 9/2006
JP 2012-236182 12/2012
(Continued)

*Primary Examiner* — Cam N. Nguyen

(57) ABSTRACT

Provided is a catalyst structure for a liquid organic hydrogen carrier (LOHC) dehydrogenation reactor, including a support, a plurality of channels formed on the support in such a manner that the LOHC may flow therethrough, and an LOHC dehydrogenation catalyst that is coated on the inner surfaces of the channels and is in contact with the LOHC to carry out LOHC dehydrogenation, wherein the hydrogen gas generated from the dehydrogenation is discharged along the channels so that the contact area between the LOHC and the LOHC dehydrogenation catalyst may be increased.

15 Claims, 3 Drawing Sheets

(51) Int. Cl.
    *B01J 23/46*     (2006.01)
    *B01J 23/755*     (2006.01)
    *B01J 23/89*     (2006.01)
    *B01J 35/04*     (2006.01)
    *C01B 3/32*     (2006.01)

(56) References Cited

U.S. PATENT DOCUMENTS

| | | | | |
|---|---|---|---|---|
| 5,304,783 | A * | 4/1994 | Clough | H05B 3/34 |
| | | | | 219/528 |
| 8,557,729 | B2 * | 10/2013 | Cairns | B01J 23/755 |
| | | | | 502/313 |
| 9,295,944 | B2 * | 3/2016 | Takagaki | H01C 17/28 |
| 9,962,652 | B2 * | 5/2018 | Omiya | B01D 53/94 |
| 9,976,466 | B2 * | 5/2018 | Takase | B01J 35/04 |
| 10,882,036 | B2 * | 1/2021 | Kingsbury | B01J 35/023 |
| 11,325,070 | B1 * | 5/2022 | Smith | B01J 8/0496 |
| 2019/0247790 | A1 * | 8/2019 | Difrancesco | B01D 53/9431 |
| 2021/0299640 | A1 * | 9/2021 | Izumi | B01J 35/026 |
| 2022/0384818 | A1 * | 12/2022 | Partridge | C25D 17/12 |

FOREIGN PATENT DOCUMENTS

| | | |
|---|---|---|
| JP | 2019-537544 | 12/2019 |
| KR | 10-2008-0034207 | 4/2008 |
| KR | 10-1950701 | 2/2019 |
| KR | 10-1954305 | 3/2019 |
| KR | 10-2020-0117354 | 10/2020 |
| WO | WO 2007-031848 | 3/2007 |
| WO | WO 2014-082801 | 6/2014 |

* cited by examiner

CATALYST STRUCTURE FOR LOHC DEHYDROGENATION REACTOR

CROSS-REFERENCE TO RELATED APPLICATION

This application claims priority of Korean Patent Application No. 10-2021-0039505, filed on Mar. 26, 2021, in the KIPO (Korean Intellectual Property Office), the disclosure of which is incorporated herein entirely by reference.

BACKGROUND OF THE INVENTION

Field of the Invention

The present disclosure relates to a catalyst structure for a liquid organic hydrogen carrier (LOHC) dehydrogenation reactor. Particularly, the present disclosure relates to a catalyst structure for a LOHC dehydrogenation reactor which increases the contact area between LOHC and an LOHC dehydrogenation catalyst to accelerate dehydrogenation.

Description of the Related Art

A liquid organic hydrogen carrier (referred to as 'LOHC', hereinafter) is a means for storing hydrogen chemically, and such hydrogen (energy) carrier/transport using a liquid organic compound is known to have excellent transport efficiency and cost-efficiency.

Among various liquid organic compound-based hydrogen carrier technologies, liquid organic compounds containing a carbon-carbon double bond have been spotlighted recently, since they are capable of storing and transporting a large capacity of hydrogen stably at ambient pressure. Referring to FIG. 1, carriage of hydrogen in the form of a liquid organic compound requires hydrogenation including reaction and binding of a liquid organic compound with hydrogen and dehydrogenation including leaving of hydrogen bound to the liquid organic compound for the purpose of hydrogen release.

Chemical hydrogen storage is performed by hydrogenation. Such hydrogenation is an exothermic reaction and prefers a low reaction temperature, but shows a significantly low hydrogen storage rate in this case. Therefore, to overcome this, a highly active hydrogenation catalyst and a method for preparing such a catalyst are required, and development of a reaction system capable of controlling the calorific value generated during the reaction is essentially required.

Chemical hydrogen extraction is performed by dehydrogenation. Such dehydrogenation is an endothermic reaction and requires a higher temperature as compared to hydrogenation. Therefore, it is essentially required to develop a high-efficiency catalyst showing a high hydrogen extraction rate at low temperature and capable of ensuring catalyst stability at high temperature. Further, since three phases, i.e., a solid catalyst, a liquid LOHC substance and gaseous hydrogen, coexist in the dehydrogenation system, it is necessary to develop a reaction system capable of easy hydrogen extraction.

According to the related art, Korean Patent Publication No. 10-1954305, published on Mar. 5, 2019, discloses a liquid compound useful as a hydrogen carrier, Korean Patent Publication No. 10-1950701, published on Feb. 21, 2019, discloses a catalyst support capable of improving hydrogenation and dehydrogenation catalyst activity, and Korean Patent Application Publication No. 10-2020-0117354, published on Oct. 14, 2020, discloses a catalyst capable of improving hydrogen storage and release.

However, there is no disclosure about the improvement of a hydrogen extraction rate through the improvement of a reaction system for hydrogen extraction itself, which occupies the most important part in the chemical hydrogen carrier technologies using LOHC substances.

SUMMARY OF THE INVENTION

The present disclosure is designed to solve the problems of the related art, and the present disclosure is directed to providing a catalyst structure for a dehydrogenation reactor, which is a novel alternative capable of increasing a hydrogen extraction rate by accelerating dehydrogenation for hydrogen extraction.

In one aspect of the present disclosure, there is provided a catalyst structure for a liquid organic hydrogen carrier (LOHC) dehydrogenation reactor, including a support, a plurality of channels formed on the support in such a manner that the LOHC may flow therethrough, and an LOHC dehydrogenation catalyst that is coated on the inner surfaces of the channels and is in contact with the LOHC to carry out LOHC dehydrogenation, wherein the hydrogen gas generated from the dehydrogenation is discharged along the channels so that the contact area between the LOHC and the LOHC dehydrogenation catalyst may be increased.

According to an embodiment of the present disclosure, the support may include a ceramic or metallic material.

According to another embodiment of the present disclosure, the support may have a plurality of protrusions formed on the outer circumferential surface thereof.

According to still another embodiment of the present disclosure, the catalyst structure for an LOHC dehydrogenation reactor may further include a heat-generating means linked to the support and configured to transfer heat required for the LOHC dehydrogenation.

According to still another embodiment of the present disclosure, the catalyst structure for an LOHC dehydrogenation reactor may further include a vibration energy-applying means linked to the support and configured to apply kinetic energy to the hydrogen gas in the channels through vibration.

According to still another embodiment of the present disclosure, the catalyst structure for an LOHC dehydrogenation reactor may further include an accelerating means linked to the rear end of the support and configured to discharge the hydrogen gas in the channels.

According to still another embodiment of the present disclosure, the LOHC dehydrogenation catalyst may be any one selected from Pt, Ru, Pd and Ni.

According to still another embodiment of the present disclosure, the channel may be formed in a tetragonal, circular or hexagonal shape.

In another aspect of the present disclosure, there is provided a hydrogen generation system including a storage unit for storing a hydrogen-storing LOHC, a dehydrogenation reactor receiving the hydrogen-storing LOHC from the storage unit and separating hydrogen from the hydrogen-storing LOHC, and a storage unit for storing hydrogen generated from the dehydrogenation reactor, wherein the dehydrogenation reactor includes the above-described catalyst structure for an LOHC dehydrogenation reactor.

According to an embodiment of the present disclosure, the hydrogen generation system may further include a heat-supplying means for supplying heat required for the dehydrogenation reactor.

According to another embodiment of the present disclosure, the hydrogenation generation system may further include an accelerating means for accelerating discharge of the hydrogen generated from the dehydrogenation reactor.

In still another aspect of the present disclosure, there is provided a method for operating the hydrogen generation system, including: supplying heat from the heat-supplying means to the dehydrogenation reactor to carry out dehydrogenation; and discharging the hydrogen generated in the dehydrogenation from the catalyst structure through the accelerating means.

The catalyst structure for a dehydrogenation reactor according to the present disclosure shows a low-pressure difference generated therein, despite a large amount of hydrogen gas generated by the flow and dehydrogenation of LOHC in the channels, and thus facilitates dehydrogenation. Particularly, the catalyst structure provides an increased hydrogen extraction rate by virtue of an increase in contact area between the LOHC and the dehydrogenation catalyst.

In addition, the catalyst structure allows easy transfer of heat required for dehydrogenation corresponding to an endothermic reaction to provide enhanced catalyst activity, and may be applied to various LOHC materials and LOHC dehydrogenation reactors based on the same.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

Figure 1:
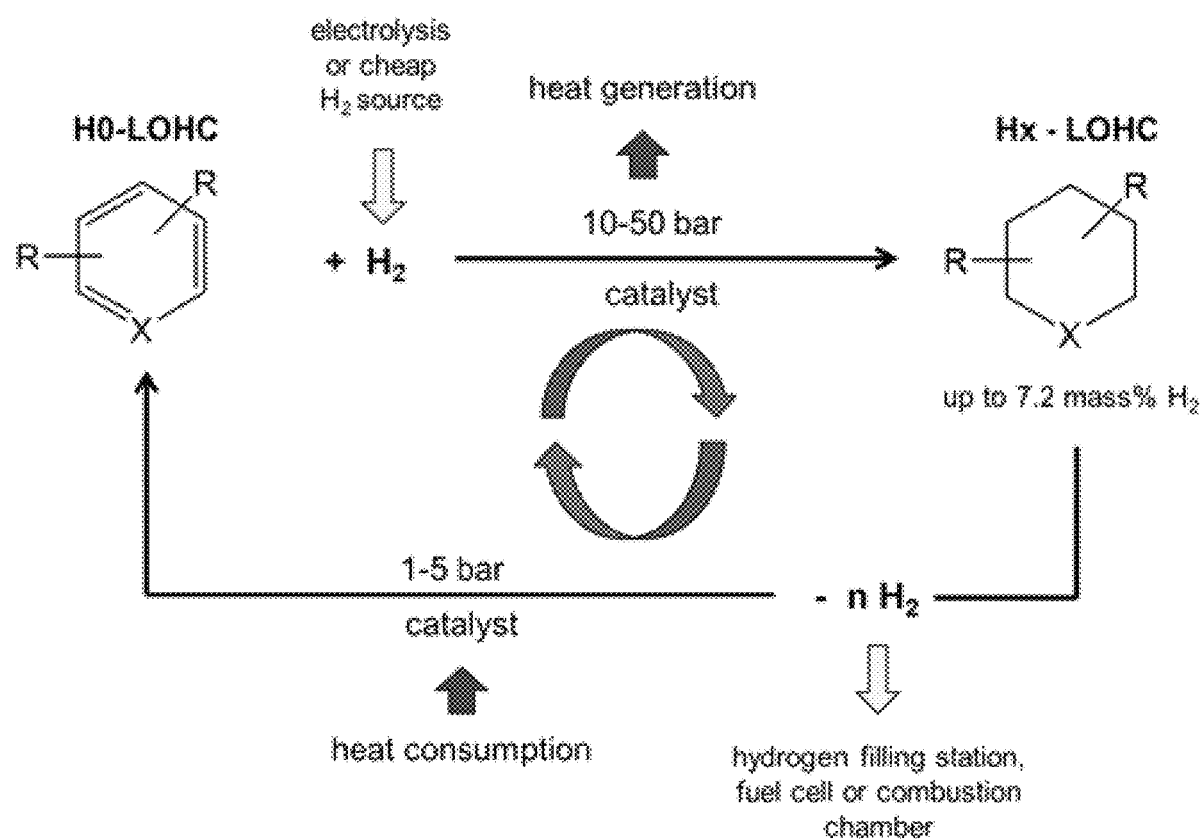
FIG. 1 illustrates hydrogenation and dehydrogenation using a liquid organic hydrogen carrier (LOHC).

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

According to the related art, when a large amount of hydrogen gas is generated from the dehydrogenation of a liquid organic hydrogen carrier (LOHC), the contact area between the LOHC and a catalyst is reduced to cause degradation of a hydrogen extraction rate of dehydrogenation for release of hydrogen stored in the LOHC. In order to overcome such a problem of the related art, the present disclosure provides a novel catalyst structure capable of increasing the contact area between the LOHC and the catalyst during the dehydrogenation. Particularly, the present disclosure is intended to increase the hydrogen extraction rate based on the LOHC dehydrogenation through the improvement of the reaction system for hydrogen extraction itself, not the characteristics of the catalyst itself.

In one aspect, there is provided a catalyst structure for an LOHC dehydrogenation reactor, including a support, a plurality of channels formed on the support in such a manner that the LOHC may flow therethrough, and an LOHC dehydrogenation catalyst that is coated on the inner surfaces of the channels and is in contact with the LOHC to carry out LOHC dehydrogenation.

The support includes a plurality of channels for discharging the hydrogen gas generated from the dehydrogenation. A large amount of hydrogen gas generated during the dehydrogenation reduces the contact area between the liquid LOHC and the solid catalyst, and thus interrupts extraction of the hydrogen from the LOHC. Particularly, the conventional catalyst structures, such as powder and pellets, are disposed compactly in a dehydrogenation reactor to cause a high-pressure difference, and thus discharge of the hydrogen gas becomes slow and the hydrogen gas causes a decrease in contact area between the LOHC and the catalyst, resulting in significant degradation of the hydrogen extraction rate through the dehydrogenation. On the contrary, according to the present disclosure, the catalyst structure having a plurality of channels formed on the support enhances discharge of the hydrogen gas to cause an increase in contact area between the LOHC and the catalyst, resulting in improvement of the hydrogen extraction rate.

In addition, the support may further include a vibration energy-applying means linked to the support in order to apply kinetic energy to the hydrogen gas generated in the channels through vibration. When a predetermined pattern of vibration is applied into the channels through the vibration energy-applying means, large hydrogen gas bubbles may be decomposed into small bubbles, and thus discharge of the hydrogen gas may be enhanced.

In addition, the support may include an accelerating means, such as a vacuum pump, linked to the rear end of the support and configured to discharge the hydrogen gas in the channels. By virtue of the accelerating means, the hydrogen gas may be removed more promptly to increase the contact area between the LOHC and the catalyst.

The support may be made of a material, such as a ceramic or metallic material, having high heat conductivity in order to supply heat required for dehydrogenation, which is an endothermic reaction, smoothly. In a variant, a plurality of protrusions may be formed on the outer circumferential surface of the support to increase the surface area and to improve the heat transfer efficiency.

In addition, the support may further include a heat-generating means, such as a heater or a heat exchanger, linked to the support in order to supply heat required for dehydrogenation, which is an endothermic reaction, and transferring heat required for LOHC dehydrogenation.

The LOHC dehydrogenation catalyst may include any one selected from Pt, Ru, Pd and Ni. However, the scope of the present disclosure is not limited thereto, since the present disclosure is intended to improve a hydrogenation extraction rate through the improvement of the dehydrogenation catalyst structure, not the characteristics of the catalyst itself.

The channel may be formed in a tetragonal, circular or hexagonal shape, but is not limited thereto. The scope of the present disclosure covers any shape, as long as the channel is used as a path for discharging the hydrogen gas generated during the dehydrogenation.

In another aspect, there is provided a hydrogen generation system including a storage unit for storing a hydrogen-storing LOHC, a dehydrogenation reactor receiving the hydrogen-storing LOHC from the storage unit and separating hydrogen from the hydrogen-storing LOHC, and a storage unit for storing hydrogen generated from the dehydrogenation reactor, wherein the dehydrogenation reactor includes the above-described catalyst structure for an LOHC dehydrogenation reactor.

The hydrogenation generation system may include a catalyst structure having channels for discharging the hydrogen generated from the dehydrogenation so that the contact area between the hydrogen-storing LOHC and the catalyst may be increased during the dehydrogenation. In this manner, it is possible to improve the hydrogen extraction rate.

In addition, the hydrogen generation system may include a heat-supplying means for supplying heat required for the dehydrogenation reactor. In this manner, it is possible to supply heat required for dehydrogenation, which is an endothermic reaction, smoothly, and to improve the hydrogen extraction rate.

Further, the hydrogenation generation system may include an accelerating means for accelerating discharge of the hydrogen generated from the dehydrogenation reactor. In this manner, it is possible to discharge the hydrogen gas generated from the dehydrogenation more promptly, to induce the contact between the LOHC and the catalyst, and thus to improve the hydrogen extraction rate. For example, the accelerating means may be a vacuum pump.

In still another aspect, there is provided a method for operating the hydrogen generation system, including: supplying heat from the heat-supplying means to the dehydrogenation reactor to carry out dehydrogenation; and discharging the hydrogen generated in the dehydrogenation from the catalyst structure through the accelerating means.

In other words, it is possible to improve the hydrogen extraction rate by supplying heat required for dehydrogenation, which is an endothermic reaction, to the dehydrogenation reactor through the heat-supplying means to accelerate the dehydrogenation, and then discharging the hydrogen gas generated from the dehydrogenation promptly through the accelerating means to improve the contact area between the LOHC and the catalyst.

Also, according to the present invention, hydrogen gas, which has a higher velocity compared to LOHC, is likely to be discharged from the channel faster than LOHC. As a result, the contact area between the catalyst and the LOHC in the channel increases because of the hydrogen gas discharge, leading to more effective hydrogen production from the channel.

Hereinafter, the present disclosure will be explained in more detail with reference to preferred examples, but the scope of the present disclosure is not limited thereto. In addition, various changes and modifications may be made by those skilled in the art without departing from the scope of the present disclosure.

EXAMPLE

Figure 2:
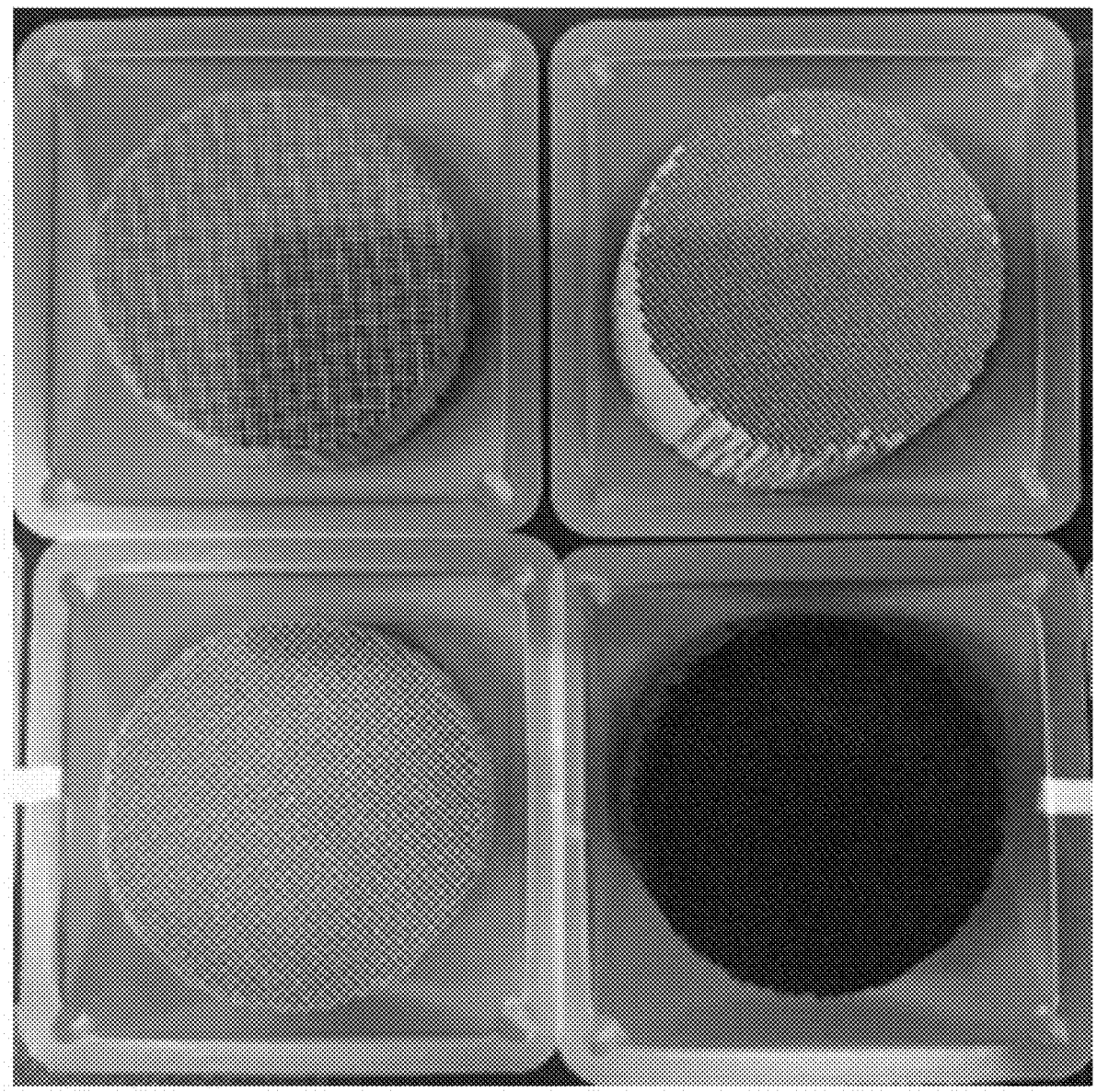
FIG. 2 shows the catalyst structure according to an embodiment of the present disclosure.
Figure 3:
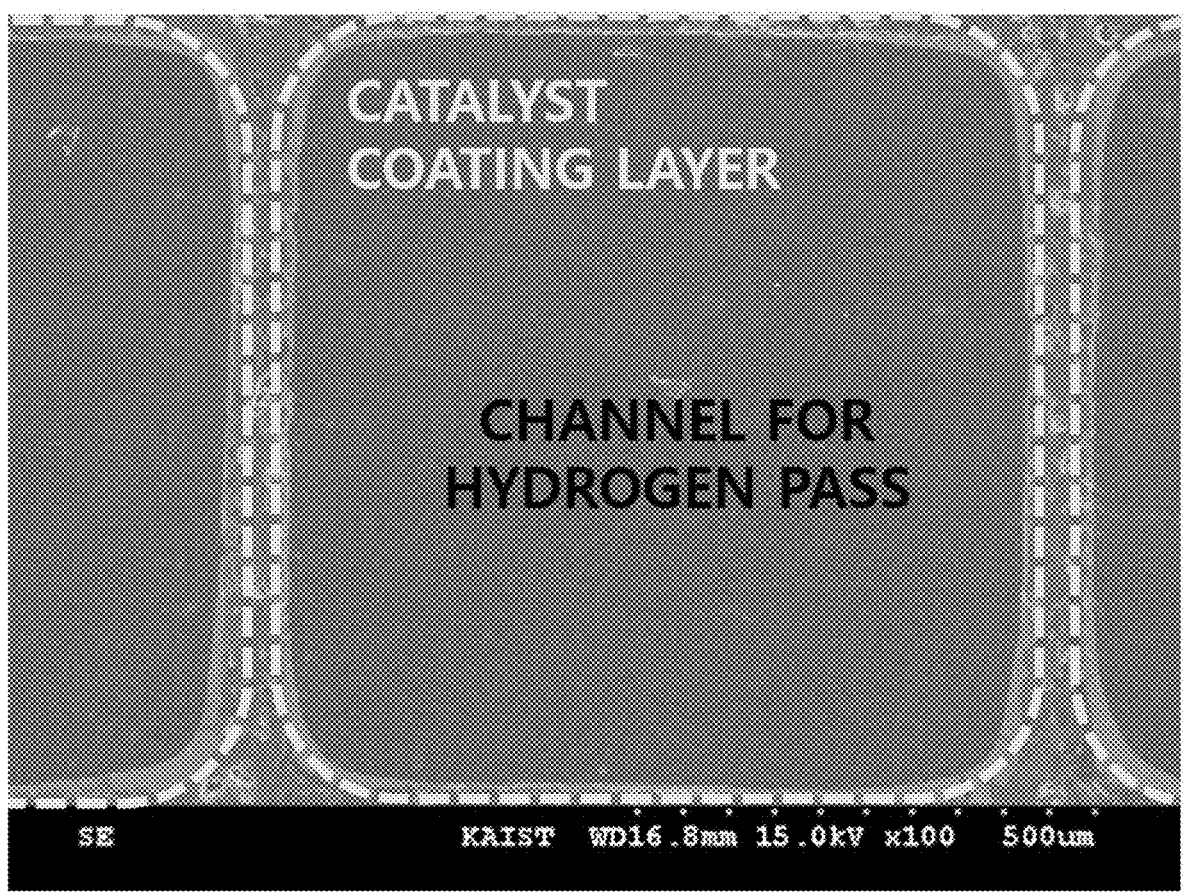
FIG. 3 shows the scanning electron microscopic (SEM) image of the catalyst structure according to an embodiment of the present disclosure.

FIG. 2 and FIG. 3 show the catalyst structure according to an embodiment of the present disclosure and the scanning electron microscopic (SEM) image of the catalyst structure, respectively.

Referring to FIG. 2 and FIG. 3, a support made of a ceramic or metallic material is prepared to obtain a catalyst structure for a liquid organic hydrogen carrier (LOHC) dehydrogenation reactor, and then a plurality of channels for discharging hydrogen gas were formed on the support. Then, slurry having the composition as shown in the following Table 1 was prepared, and subjected to ball milling for 24 hours by using zirconia balls. After that, the support was introduced to the slurry so that the dehydrogenation catalyst might be coated on the support through dip coating, and then the resultant product was dried at 120° C. for 1 hour. Then, the dip coating and drying were repeated several times, and heat treatment was carried out at 400-800° C. for 4 hours to obtain a catalyst structure coated with the dehydrogenation catalyst.

TABLE 1

|  | Material | Weight (g) |
|---|---|---|
| Catalyst powder | Pt, Pd, etc. | 4 |
| Solvent | 78 wt % xylene + 22 wt % butanol | 16 |
| Dispersant | polyvinylpyrrolidone | 0.2 |
| Plasticizer | Polyethylene glycol | 0.2 |
| Binder | Butvar B-98 | 0.16 |

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A dehydrogenation system for a liquid organic hydrogen carrier (LOHC), comprising:
   a support;
   a plurality of channels formed on the support in such a manner that the LOHC may flow therethrough;
   an LOHC dehydrogenation catalyst that is coated on the inner surfaces of the channels and is in contact with the LOHC to carry out LOHC dehydrogenation; and
   a heat-generating means linked to the support and configured to transfer heat required for the LOHC dehydrogenation,
   wherein the hydrogen gas generated from the dehydrogenation is discharged along the channels so that the contact area between the LOHC and the LOHC dehydrogenation catalyst may be increased.

2. The dehydrogenation system of claim 1, wherein the support comprises a ceramic or metallic material.

3. The dehydrogenation system of claim 1, wherein the support has a plurality of protrusions formed on the outer circumferential surface thereof.

4. The dehydrogenation system of claim 1, further comprising a vibration energy-applying means linked to the support and configured to apply kinetic energy to the hydrogen gas in the channels through vibration.

5. The dehydrogenation system of claim 1, further comprising an accelerating means linked to the rear end of the support and configured to discharge the hydrogen gas in the channels.

6. The dehydrogenation system of claim 5, wherein the accelerating means is a vacuum pump.

7. The dehydrogenation system of claim 1, wherein the LOHC dehydrogenation catalyst is any one selected from a group consisting of Pt, Ru, Pd and Ni.

8. The dehydrogenation system of claim 1, wherein the channels are formed in a tetragonal, circular or hexagonal shape.

9. A dehydrogenation system for a liquid organic hydrogen carrier (LOHC), comprising:
   a support comprises a plurality of protrusions formed on the outer circumferential surface thereof;
   a plurality of channels formed on the support;
   an LOHC dehydrogenation catalyst that is coated on the inner surfaces of the channels and is in contact with the LOHC to carry out LOHC dehydrogenation; and
   a heat-generating means linked to the support and configured to transfer heat required for the LOHC dehydrogenation.

10. The dehydrogenation system of claim 9, wherein the support comprises a ceramic or metallic material.

11. The dehydrogenation system of claim 9, further comprising a vibration energy-applying means linked to the support and configured to apply kinetic energy to the hydrogen gas in the channels through vibration.

12. The dehydrogenation system of claim 9, further comprising an accelerating means linked to the rear end of the support and configured to discharge the hydrogen gas in the channels.

13. The dehydrogenation system of claim 12, wherein the accelerating means is a vacuum pump.

14. The dehydrogenation system of claim 9, wherein the LOHC dehydrogenation catalyst is any one selected from a group consisting of Pt, Ru, Pd and Ni.

15. The dehydrogenation system of claim 9, wherein the channels are formed in a tetragonal, circular or hexagonal shape.

* * * * *